(12) United States Patent
Landry

(10) Patent No.: US 8,839,123 B2
(45) Date of Patent: Sep. 16, 2014

(54) GENERATING A VISUAL USER INTERFACE

(75) Inventor: Robin J. Landry, Apex, NC (US)

(73) Assignee: Red Hat, Inc., Raleigh, NC (US)

( * ) Notice: Subject to any disclaimer, the term of this patent is extended or adjusted under 35 U.S.C. 154(b) by 742 days.

(21) Appl. No.: 11/942,323

(22) Filed: Nov. 19, 2007

(65) Prior Publication Data

US 2009/0132917 A1    May 21, 2009

(51) Int. Cl.
*G06F 3/048* (2013.01)
*G06F 3/00* (2006.01)
*G06F 3/0488* (2013.01)
*G06F 3/023* (2006.01)

(52) U.S. Cl.
CPC .......... *G06F 3/0237* (2013.01); *G06F 3/04886* (2013.01); *G06F 3/0236* (2013.01); *G06F 3/04883* (2013.01)
USPC ............ 715/763; 715/762; 715/773; 715/726

(58) Field of Classification Search
CPC ....................... G06F 3/04886; H04M 2250/70
USPC .......... 715/764, 773, 834, 762–763, 780, 826
See application file for complete search history.

(56) References Cited

U.S. PATENT DOCUMENTS

| | | | | |
|---|---|---|---|---|
| 5,502,803 A | * | 3/1996 | Yoshida et al. | 715/201 |
| 5,664,896 A | * | 9/1997 | Blumberg | 400/485 |
| 5,682,511 A | * | 10/1997 | Sposato et al. | 715/716 |
| 5,745,717 A | * | 4/1998 | Vayda et al. | 715/834 |
| 5,790,115 A | * | 8/1998 | Pleyer et al. | 715/716 |
| 5,953,541 A | * | 9/1999 | King et al. | 710/67 |
| 6,286,064 B1 | * | 9/2001 | King et al. | 710/67 |
| 6,377,966 B1 | * | 4/2002 | Cooper et al. | 715/263 |
| 6,392,640 B1 | * | 5/2002 | Will | 345/184 |
| 6,405,060 B1 | * | 6/2002 | Schroeder et al. | 455/566 |
| 6,476,825 B1 | * | 11/2002 | Croy et al. | 715/716 |
| 6,483,913 B1 | * | 11/2002 | Smith | 379/368 |
| 6,615,293 B1 | * | 9/2003 | Shima et al. | 710/30 |
| 6,909,424 B2 | * | 6/2005 | Liebenow et al. | 345/169 |
| 7,020,270 B1 | * | 3/2006 | Ghassabian | 379/368 |
| 7,039,868 B2 | * | 5/2006 | Yanatsubo | 715/712 |
| 7,190,351 B1 | * | 3/2007 | Goren | 345/173 |
| 7,240,293 B2 | * | 7/2007 | Lungwitz et al. | 715/780 |
| 7,286,115 B2 | * | 10/2007 | Longe et al. | 345/168 |
| 7,385,592 B2 | * | 6/2008 | Collins | 345/173 |
| 7,487,147 B2 | * | 2/2009 | Bates et al. | 1/1 |
| 7,565,625 B2 | * | 7/2009 | Mullins et al. | 715/835 |
| 7,934,236 B1 | * | 4/2011 | Amir et al. | 715/816 |
| 2002/0000978 A1 | * | 1/2002 | Gerpheide | 345/173 |
| 2002/0093535 A1 | * | 7/2002 | Murphy | 345/764 |
| 2002/0149569 A1 | * | 10/2002 | Dutta et al. | 345/173 |
| 2003/0020761 A1 | * | 1/2003 | Yanatsubo | 345/833 |
| 2003/0197736 A1 | * | 10/2003 | Murphy | 345/780 |

(Continued)

*Primary Examiner* — Amy Ng
*Assistant Examiner* — William Wong
(74) *Attorney, Agent, or Firm* — Lowenstein Sandler LLP

(57) ABSTRACT

An interface engine is configured to generate a user interface on a display coupled to an electronic device. The interface engine is configured to display characters, in the user interface, that may input into the electronic device. The interface engine is configured to generate the user interface to include character sections. The interface engine is configured to associate a sub-set of the characters with each character sections. The sub-set of characters included in each character section can be based on the frequency that the characters are used and/or the patterns in which the characters are used. Additionally, the sub-set of characters associated with each character section can be selected by the user.

20 Claims, 11 Drawing Sheets

(56) References Cited

U.S. PATENT DOCUMENTS

| | | |
|---|---|---|
| 2004/0056844 A1* | 3/2004 | Gutowitz et al. ............. 345/168 |
| 2004/0066405 A1* | 4/2004 | Wessler et al. ............... 345/764 |
| 2004/0080487 A1 | 4/2004 | Griffin et al. |
| 2004/0104896 A1* | 6/2004 | Suraqui ......................... 345/168 |
| 2004/0168131 A1* | 8/2004 | Blumberg ..................... 715/534 |
| 2004/0179041 A1* | 9/2004 | Fam .............................. 345/826 |
| 2004/0183834 A1* | 9/2004 | Chermesino ................. 345/773 |
| 2005/0184959 A1* | 8/2005 | Kompe et al. ................ 345/163 |
| 2005/0210402 A1* | 9/2005 | Gunn et al. ................... 715/773 |
| 2005/0225538 A1* | 10/2005 | Verhaegh ...................... 345/173 |
| 2005/0240879 A1* | 10/2005 | Law et al. ..................... 715/773 |
| 2005/0268247 A1* | 12/2005 | Baneth ......................... 715/781 |
| 2006/0095844 A1* | 5/2006 | Van Leeuwen ............... 715/700 |
| 2006/0236239 A1 | 10/2006 | Simpson et al. |
| 2007/0075976 A1* | 4/2007 | Kun et al. ..................... 345/172 |
| 2007/0079239 A1* | 4/2007 | Ghassabian .................. 715/707 |
| 2007/0089070 A1* | 4/2007 | Jaczyk ......................... 715/816 |
| 2007/0256029 A1* | 11/2007 | Maxwell ....................... 715/834 |
| 2008/0036743 A1* | 2/2008 | Westerman et al. .......... 345/173 |
| 2008/0055263 A1* | 3/2008 | Lemay et al. ................. 345/173 |
| 2008/0141125 A1* | 6/2008 | Ghassabian .................. 715/261 |
| 2008/0168366 A1* | 7/2008 | Kocienda et al. ............. 715/764 |
| 2010/0185971 A1* | 7/2010 | Ito ................................ 715/773 |

* cited by examiner

GENERATING A VISUAL USER INTERFACE

FIELD

This invention relates generally to interface and input methods and devices, more particularly, to methods and systems for generating a visual user interface.

DESCRIPTION OF THE RELATED ART

Currently, consumers are utilizing small computing devices, such as cell phones, personal digital assistants (PDAs), tablet computers, etc., to perform tasks, such as electronic mail (email), text messaging, word processing, that are typically performed on standard-size computing devices. When performing these tasks, the consumers are often required to enter large amount of text on the small computing devices. In standard-size computing devices, consumers typically enter the text using a standard keyboard.

Entering text on small computing devices has been done in a number of ways. For example, small keypads with layouts that are very similar to large keyboards have been created. Additionally, small computing devices may include keypads having a plurality of multi-function keys. Usually, each key of the plurality of the keys are associated with more than one text character, such as letters, punctuation elements and/or numbers. For example, the keypad may include eight keys with each key being associated with a different group of text characters and with each group comprising three or four letters and one number. Further, the small computing devices may include predictive text software that automatically completes commonly used words.

Also, virtual keypads have been used to enter text into small computing devices. Often virtual keypads will replicate the action of pressing a key by using a touch screen and a stylus. In the case of the conventional virtual keypad, the touch screen must be large enough to accommodate displaying both the virtual keypad and other data for the small computing device, such as the entered text.

Both the reduced keypads and virtual keypads require valuable real estate on the small computing devices. For the reduced keyboard, the small computing devices must include physical space for the reduced keypads. This physical space may occupy a large percentage of the device or require the size of the device to be increased. For the virtual keypads, the small computing devices must utilize a large percentage of a display screen to display the keypads. Additionally, in both cases, the reduced keypads and virtual keypads may be cumbersome to use. Accordingly, there is a need in the art for a mechanism to provide an interface that minimizes device real estate and that provides a user-friendly input interface.

BRIEF DESCRIPTION OF THE DRAWINGS

Various features of the embodiments can be more fully appreciated, as the same become better understood with reference to the following detailed description of an embodiment when considered in connection with the accompanying figures, in which.

DETAILED DESCRIPTION OF EMBODIMENTS

For simplicity and illustrative purposes, the principles of the present invention are described by referring mainly to exemplary embodiments thereof. However, one of ordinary skill in the art would readily recognize that the same principles are equally applicable to, and can be implemented in, all types of computing systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments relate generally to methods and systems for generating a visual user interface. More particularly, an interface engine is configured to generate a user interface on a display coupled to an electronic device. The interface engine is configured to display characters, in the user interface, that may input into the electronic device. The interface engine is configured to generate the user interface to include character sections. The interface engine is configured to associate a sub-set of the characters with each character sections. The sub-set of characters included in each character section can be based on the frequency that the characters are used, the pattern in which the characters are used, and combinations thereof. Additionally, the sub-set of characters associated with each character section can be selected by the user.

For example, the interface engine can be configured to generate a user interface including four character sections. The four character sections can be configured to display a sub-set of characters available for input into an electrical device. The interface engine can be configured to direct the display to display the character sections near the edge of the display.

The interface engine can be configured to receive actions from the display, for example a touch sensitive display. The interface engine can be configured to translate the received actions into operations related to the characters associated with the interface. The actions can be physical interactions with the display. The operations can be a request to change characters displayed in the user interface and character sections. The operations can be a request to select and input a character into the electronic device. The interface engine can also be configured to receive actions for a secondary input.

Figure 1:
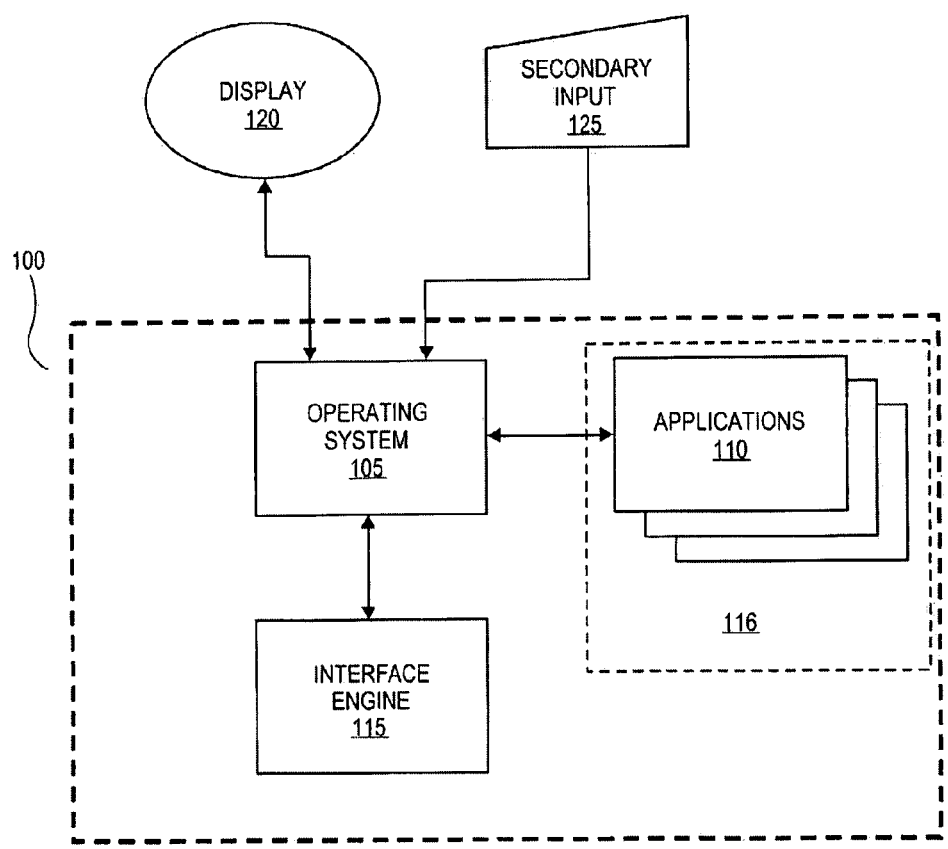
FIG. 1 illustrates an exemplary software environment consistent with embodiments.

FIG. 1 illustrates an exemplary software environment 100 in accordance with an embodiment. It should be readily apparent to those of ordinary skill in the art that software environment 100 depicted in FIG. 1 represents a generalized schematic illustration and that other components may be added or existing components may be removed or modified.

As shown in FIG. 1, software environment 100 can include an operating system 105, applications 110, and interface engine 115. Operating system 105 can be any type of operating system depending of the type of electronic device or computing platform in which software environment 100 resides. Operating system 105 can be a version of a Linux™, Linux™ mobile, Symbian, UNIX™, Windows™, Windows™ mobile, Palm™ OS, iPod™ OS, or any type of operating system.

A run-time environment (not shown) can be configured to execute on operating system 105. The run-time environment can provide a set of software that supports the execution of applications 110. The run-time environment can also comprise an application program interface ("API") (not shown) and a complementary API (not shown) within an application space 116. The APIs can be configured to provide a set of routines that application space 116 uses to request lower-level services performed by operating system 105. Operating system 105 can include a kernel (not shown). The kernel can be configured to provide secure access to the underlying hardware of a processor.

Application space 116 can represent the space where a user can execute applications given the allotted memory space as determined by a system administrators of software environment 100. Within application space 116, a user can open and execute a number of applications 110. Applications 110 that can be executed within application space 116 can be a wide variety from databases, electronic mail, customer relationship management programs, utilities, browsers, multi-media application, word processing applications, spreadsheet applications, etc. Each of applications 110 has data objects, such as a native file and/or document format, that is associated with the respective application. For example, Microsoft Word™ has default document format, a Word document. Similarly, Adobe™ has a default document type, "pdf" file, as another example.

Software environment 100 can be coupled to a display 120 and secondary input 125. Display 120 can be utilized to display data from software environment 100. Display 120 can also be utilized to interface with software environment 100. For example, display 120 can be a touch sensitive display (TSD). The TSD is capable of translating physical actions on the surface on the display into signals. Software environment 100 can utilize the signals as input into software environment 100. For example, TSD is capable of translating action such as directional physical movements and touch actions on the surface of display 120.

Secondary input 125 can be an type of input to enter data into software environment 100. For example, secondary input 125 can be one or more additional character keys, switches, toggles, keypads, and the like for providing additional input into software environment 100.

According to embodiments, software environment 100 can further include a interface engine 115. Interface engine 115 can be configured to generate a user interface on display 120. Interface engine 115 can be configured to display characters, in the user interface, that can be input into software environment 100. Interface engine 115 can be configured to generate the user interface to include character sections. Interface engine 115 can be configured to associate a sub-set of the characters with each character sections. The sub-set of characters associated with each character section can be based on the frequency that the characters are used. Additionally, the sub-set of characters associated with each character section can be selected by the user.

For example, interface engine 115 can be configured to generate a user interface including four character sections. The four character sections can be configured to display a subset of characters available for input into software environment 100. The interface engine can be configured to direct display 120 to display the character sections near edges of display 120.

Interface engine 115 can be configured to receive actions from display 120, for example a TSD. Interface engine 115 can be configured to translate the received actions into operations related to the characters associated with the interface. The actions can be physical interactions with display 120. The operations can be a request to change characters displayed in the user interface and character sections. The operations can be a request to select and input a character into the electronic device. Interface engine 115 can also be configured to receive actions for secondary input 125.

Figure 2:
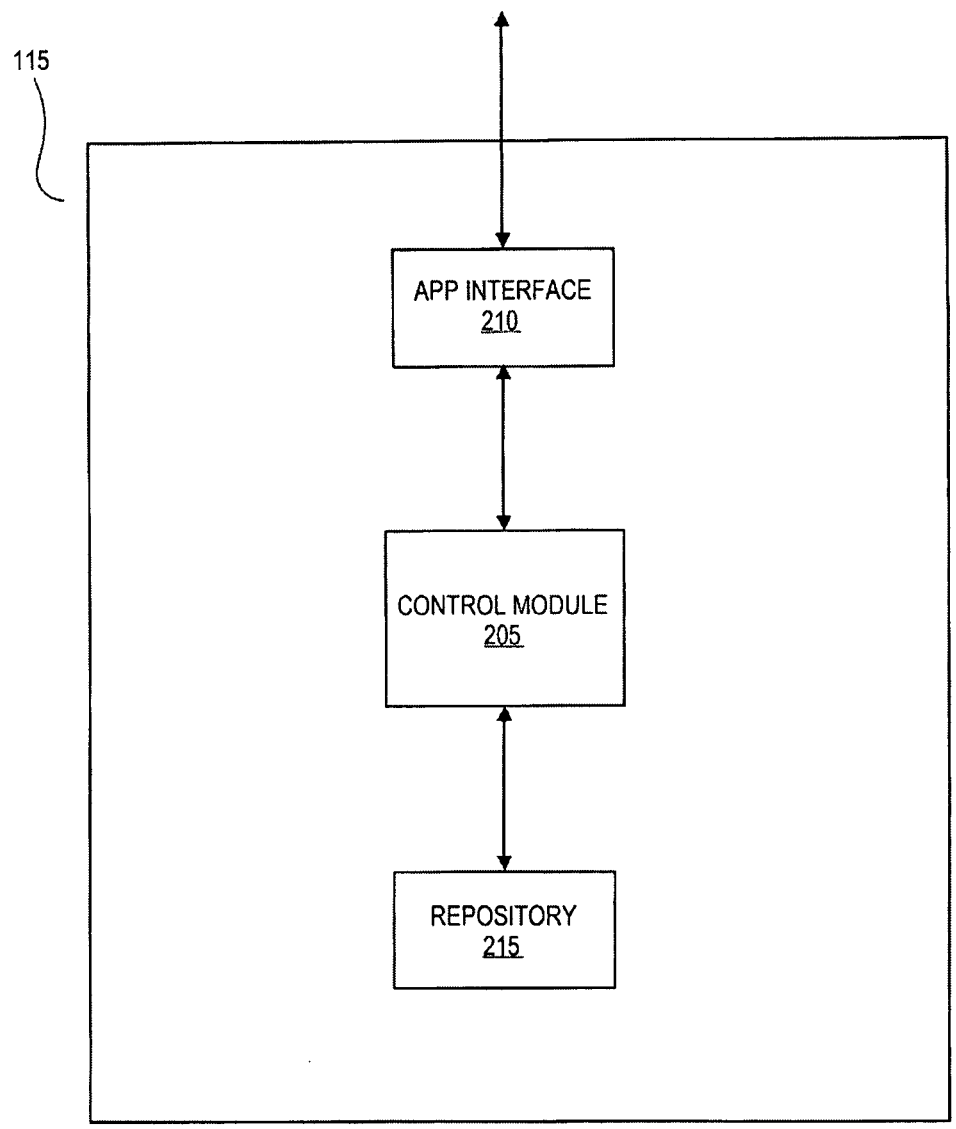
FIG. 2 illustrates an exemplary interface engine consistent with embodiments.

FIG. 2 depicts a more detailed block diagram of interface engine 115 in accordance with another embodiment. It should be readily apparent to those of ordinary skill in the art that the diagram depicted in FIG. 2 represents a generalized schematic illustration and that other components may be added or existing components may be removed or modified.

As shown in FIG. 2, interface engine 130 can comprise a control module 205, an application interface 210, and a repository 215. Modules 205-215 of interface engine 115 can be implemented as software components, hardware components or combinations thereof. More particularly, modules 205-215 can be implemented using conventional programming languages (e.g., Pascal, FORTRAN, etc.), objected oriented programming languages (e.g., C++), Java, PHP, Perl, or other similar languages. Modules 205-215 can also be implemented as hardware components such as an application specific integrated circuit, a programmable read-only memory, an EEPROM, a microcontroller, a microprocessor or other similar computing platform.

Control module 205 can be configured to manage modules 210 and 215 to provide the functionality of interface engine 115 as previously described and further described herein below.

Control module 205 can be coupled to application interface 210. Application interface 210 can be configured to provide an interface to the components of software environment 100, such as operating system 105 and application 110. Application interface 210 can be configured to generate a user interface for inputting data into software environment 100. At the direction of control module 205, application interface 210 can be configured to generate the user interface to include character sections. The character sections can be associated with a sub-set of character that may be input into software environment 100.

Control module 205 can be further coupled to repository 215. Repository 215 can be configured to store characters to be associated with the interface generated by application interface 210. Repository 215 can be configured to store the specific associations with the character section of the user interface. When generating the user interface, control module 205 can retrieve the character associations from repository 215. Control module 205 can pass the character associations to application interface 210 in order to generate the user interface.

The character associations stored in repository 215 can be based on the frequency that the characters are used. For example, the character association can be based on keyboard layout schemes such as QWERTY or Dvorak simplified layout. Additionally, the character associations stored in repository 215 can be based on the pattern in which the characters are used. For example, the pattern can be the frequency characters appear next to one another in words. Additionally, interface engine 115 can be configured to allow a user to define the characters associations. As such, application interface 210 can be configured to generate a user interface to allow the user to select characters to be displayed in the character sections of the user interface. After selection, control module 205 can store the selected characters in repository 215.

Application interface 210 can be configured to receive input actions associated with operations related to the character sections of the user interface. For, the actions can be related to the changing characters displayed in the user interface and to selecting a character for input into software environment 100 and application 110. Application interface 210 can be configured to pass the received action to control module 205.

Control module 205 can be configured to translate the action into the appropriate operations. The actions and operation associations can be stored in repository 215. When control module 205 receives an action, control module 205 can access repository to determine the operation associated with the action. For, the actions can be physical interactions with display 120. The operations can be a request to change characters displayed in the user interface and character sections. The operations can be a request to select and input a character into the electronic device. Interface engine 115 can also be configured to receive actions for secondary input 125.

Interface engine 115 can be configured to generate a variety of configuration of the user interface. FIGS. 3A-3D are diagrams illustrating exemplary interfaces generated by interface engine 115 on an electronic device 300 for entering data into an electronic device in accordance with embodiments. It should be readily apparent to those of ordinary skill in the art that the diagram depicted in FIGS. 3A-3D represents a generalized schematic illustration and that other components may be added or existing components may be removed or modified.

Figure 3A:
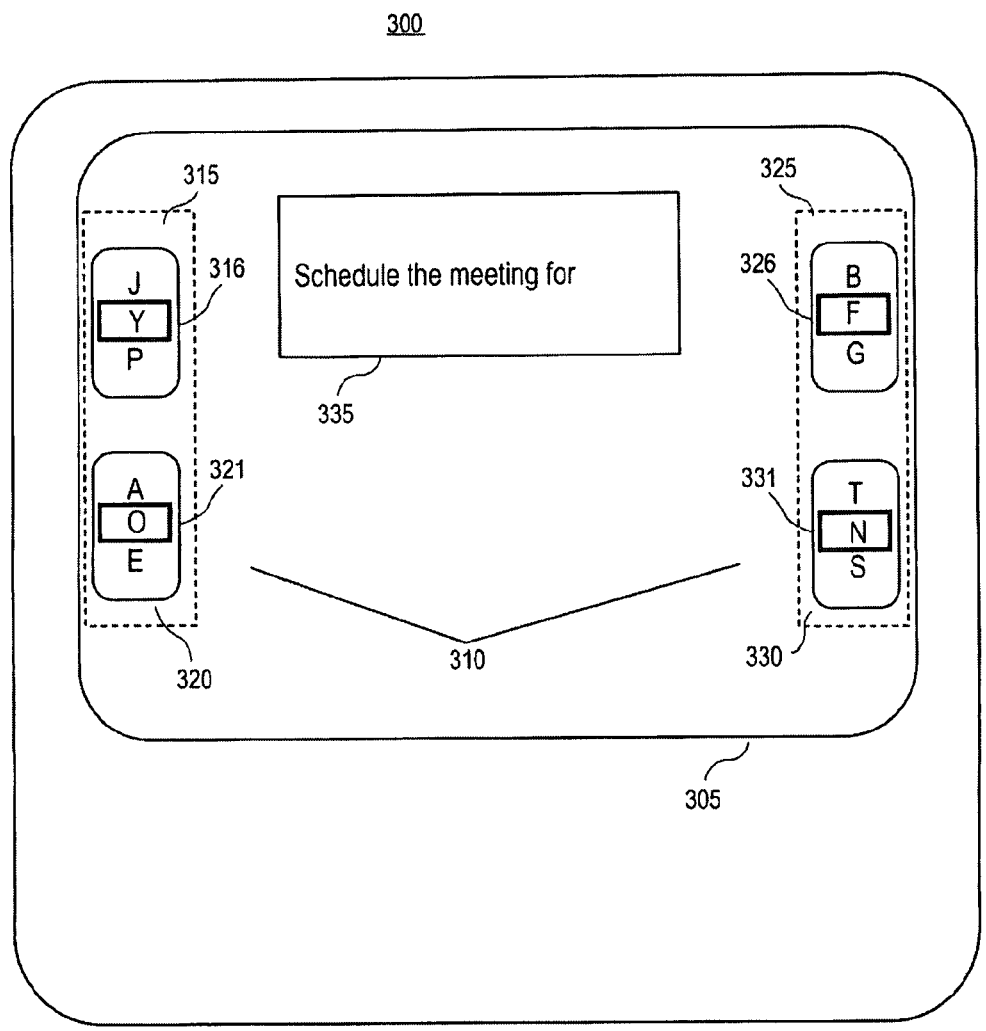
FIGS. 3A-3D illustrate exemplary user interfaces consistent with embodiments.

As illustrated in FIG. 3A, electronic device 300 can include a display 305. Display 305 can be a TSD capable of receiving input from a user. Electronic device 300 can include software environment 100 with interface engine 115. Electronic device 300 can be device capable of supporting software environment 100 such as tablet computers, micro laptops, Palm computers, personal digital assistants ("PDAs"), cellular telephones, text devices, electronic gaming and entertainment devices, and the like. According to embodiments, interface engine 115 can generate an input interface 310 to be displayed on display 305. Input interface 310 can include a character sections 315, 320, 325, and 330. Interface engine 115 associates a sub-set of characters that can be entered into electronic device 300 with character sections 315, 320, 325, and 330.

Display 305 can also be configured to display an output 335. Output 335 can represent the visual output from an application 110 operating in software environment 100. For example, output 335 can be an email graphical user interface from an email application.

Interface 115 can be configured to associate any subset of the characters utilized by electronic device 300 with character sections 315, 320, 325, and 330. The characters associated with each particular character sections 315, 320, 325, and 330 can be based on a keyboard layout schemes such as QWERTY or Dvorak simplified layout.

For example, interface engine 115 can associate the subset of characters displayed in character sections 315, 320, 325, and 330 as follows in Table 1:

TABLE 1

| Character section 315 | Character section 320 | Character section 325 | Character section 330 |
|---|---|---|---|
| J | A | C | D |
| Y | O | B | H |
| P | E | F | T |
| W | U | G | N |
| M | I | R | S |
| K | X | L | V |

Interface engine 115 can store Table 1 in repository 215. As such, control module 205 can access Table 1 when instructing application interface 210 to generate interface 310. Additionally, control module 205 can access Table 1 when receiving actions associated with operations related to interface 310. Each subset of characters associated with character sections 315, 320, 325, and 330 can be stored in a data structure such that allows interface engine 115 to perform operations to traverse the character lists. For example, the subset of characters can be stored in a singly-linked list, doubly-linked list, circularly-linked list, and combinations thereof.

Each subset of character can be stored in the data structure based on patterns of use of the characters. The patterns can be the frequency with which characters are proximately positioned in words. For example, when forming words, the character "Q" is typically followed by the character "U." As such, the character "Q" can be stored one position below "U" in the data structure since in most cases "U" will likely follow "Q". As such, "U" can always be one step from "Q" when traversing the subset of characters.

The particular characters included in the subset of characters can also be based on the patterns of use. For example, if the character "Q" is associated with character section 310, interface engine can automatically associate "U" with character section 310 based on the pattern of use of "Q" and "U."

As illustrated in FIG. 3A, interface engine 115 can be configured to generate interface 310 to display one or more characters in associated with character sections 315, 320, 325, and 330. For example, interface engine can generate interface 310 to display three characters from the sub-sets in character sections 315, 320, 325, and 330. Interface engine 115 can also generate character sections 315, 320, 325, and 330 to include highlighting elements 316, 321, 326, and 331, respectively. Highlighting elements 316, 321, 326, and 331 indicate which character is selected in each character section. While FIG. 3 illustrates four character section in interface 310, one skilled in the art will realize that interface 310 can include any number of character sections.

According to embodiments, a user of electronic device 300 can utilize display 305 to initiate operations associated with interface 310. The user can perform actions on display 305 in order to initiate operations associated with interface 310. For example, the actions performed by the user can be physical actions such as directional finger movements (upwards, downwards, left or right), touches, or other tactile interactions on display 305. In this case, display 305 can be a TSD.

The actions are passed to interface engine 115 in software environment 100. For example, operating system 105 may receive the signals which represent the actions and pass the signals to interface engine 115. Interface engine 115 can translate the actions into the appropriate operations associated with interface 310. Interface engine 115 can maintain a data structure that stores the action and operation associations in repository 215. As such, interface engine 115 can receive the signals representing actions via application interface 210.

Control module 205 can translate the actions by accessing the data structure stored in repository 215.

Figure 4A:
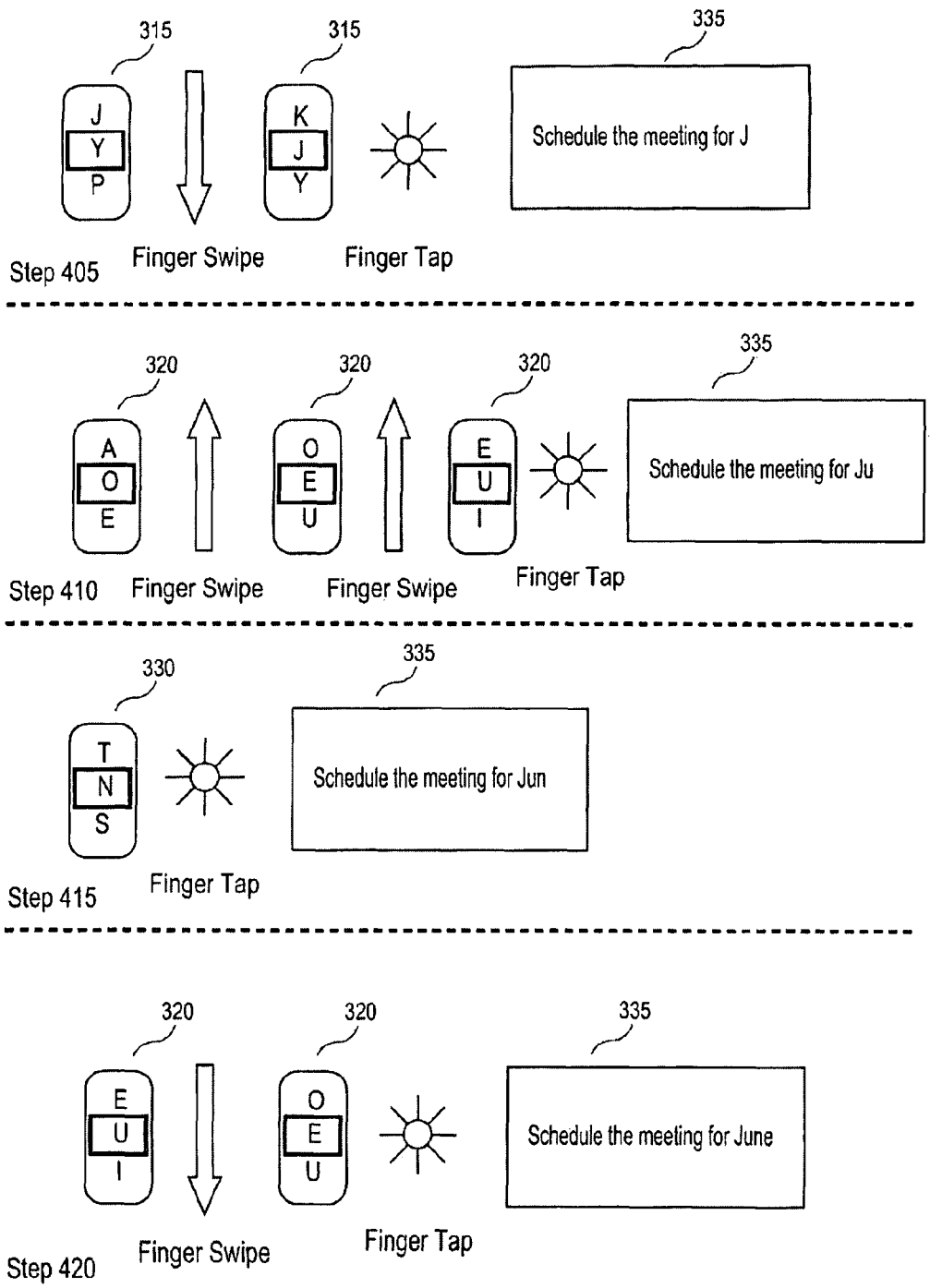
FIGS. 4A and 4B illustrate exemplary interface actions consistent with embodiments.
Figure 4B:
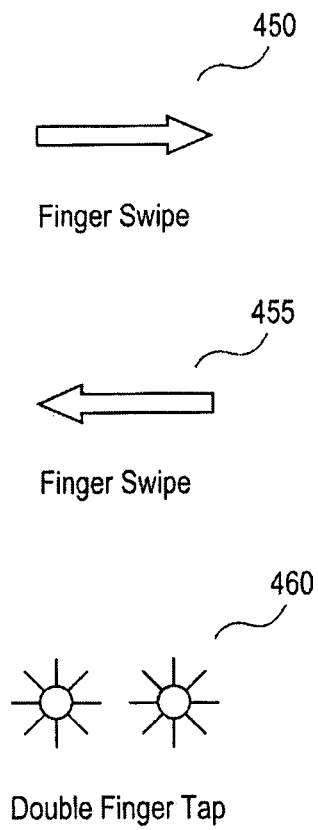

In response to the user action, interface engine 115 can perform an operation to alter the characters displayed in character sections 315, 320, 325, and 330 to display different characters associated with the character sections. For example, a user of electronic device 300 can utilize display 305 in order to scroll through characters displayed in character sections 315, 320, 325, and 330 and to select the characters in highlighting elements 316, 321, 326, and 331. Additionally, in response to user action, interface engine 115 can perform an operation to forward a character selected by the user to an application. As such, the application can update the output to display 305, such as output 335. FIGS. 4A and 4B are diagrams illustrating an exemplary actions by a user to initiate the operations performed by interface engine 115.

FIG. 4A shows an example of user interaction with interface 310 in order to scroll through characters associated with character sections 315, 320, 325, and 330 and to select a character. For example, assume a user desired to finish the sentence in output 335 with the word "June."

In step 405, the user can swipe a finger downward over character section 315 to display "J" in the highlighting element 316. In response, interface engine 115 can receive the action from the display and can shift the characters displayed in character section 315 down by one to display "KJY" with J in highlighting element 316. Then, to select "J", the user can tap character section 315. In response, interface engine 115 can receive the action from the display and designate "J" as a selected character. Interface engine 115 can pass the selected character "J" to the appropriate application to be displayed in output 335.

Next, in step 410, the user can swipe a finger upward, twice, over character section 320 to display "U" in the highlighting element 321. In response, interface engine can receive the action from the display and can shift the characters displayed in character section 320 upward by two to display "EUI" with "U" in highlighting element 321. Then, to select "U", the user can tap character section 320. In response, interface engine 115 can receive the tap action from the display and designate "U" as a selected character. Interface engine 115 can pass the selected character "U" to the appropriate application to be displayed in output 335.

Then, in step 415, to select "N", the user can tap character section 330 already displaying N in highlighting element 331. In response, interface engine 115 can receive the tap action from the display and designate "N" as a selected character. Interface engine 115 can pass the selected character "N" to the appropriate application to be displayed in output 335.

Finally, in step 420, the user can swipe a finger downward, once, over character section 320 to display "E" in the highlighting element 321. In response, interface engine can receive the action from the display and can shift the characters displayed in character section 320 downward by one to display "OEU" with "E" in highlighting element 321. Then, to select "E", the user can tap character section 320. In response, interface engine 115 can receive the tap action from the display and designate "E" as a selected character. Interface engine 115 can pass the selected character "E" to the appropriate application to be displayed in window 335.

Also, a user can perform additional directional actions on display 305 to interact with software environment 100. FIG. 4B shows additional examples user interaction with interface 310 in order to enter input into electronic device 300. As illustrated, a user can perform additional actions on display 305 to provide input to electronic device 300.

For example, interface engine 115 can be configured to receive an action 450 representing a forward finger swipe on display 305. Interface engine 115 can be configured to associate action 450 which operation such as forward spacing and the like. Also, interface engine 115 can be configured to receive an action 455 representing a backwards finger swipe on display 305. Interface engine 115 can be configured to associate action 455 with operations such as back spacing. Also, interface engine 115 can be configured to receive an action 460 representing a double finger tap on display 305. Interface engine 115 can be configured to associate action 460 with operations such as carriage return.

In the example described in FIGS. 4A and 4B, the user can enter each character associated with the word. According to embodiments, interface engine 115 can also be configured to automatically complete commonly used words. As such, interface engine 115 can store a list of commonly used words in repository 215. When interface engine 115 detects characters associated with commonly used words, interface engine 115 can present the user with the option of automatically completing the word. For example, if a user selects "th" as characters, interface engine 115 can detect this word as possibly being "the" Interface engine 115 can allow the use to select automatically completing "the" or allow the user to continue enter different characters.

As illustrated in FIG. 3A, character sections 315, 320, 325, and 330 can be placed near the edges of electronic device 300. As such, a user can easily interact with character sections 315, 320, 325, and 330 will holding electronic device 300 by each side.

Figure 3B:
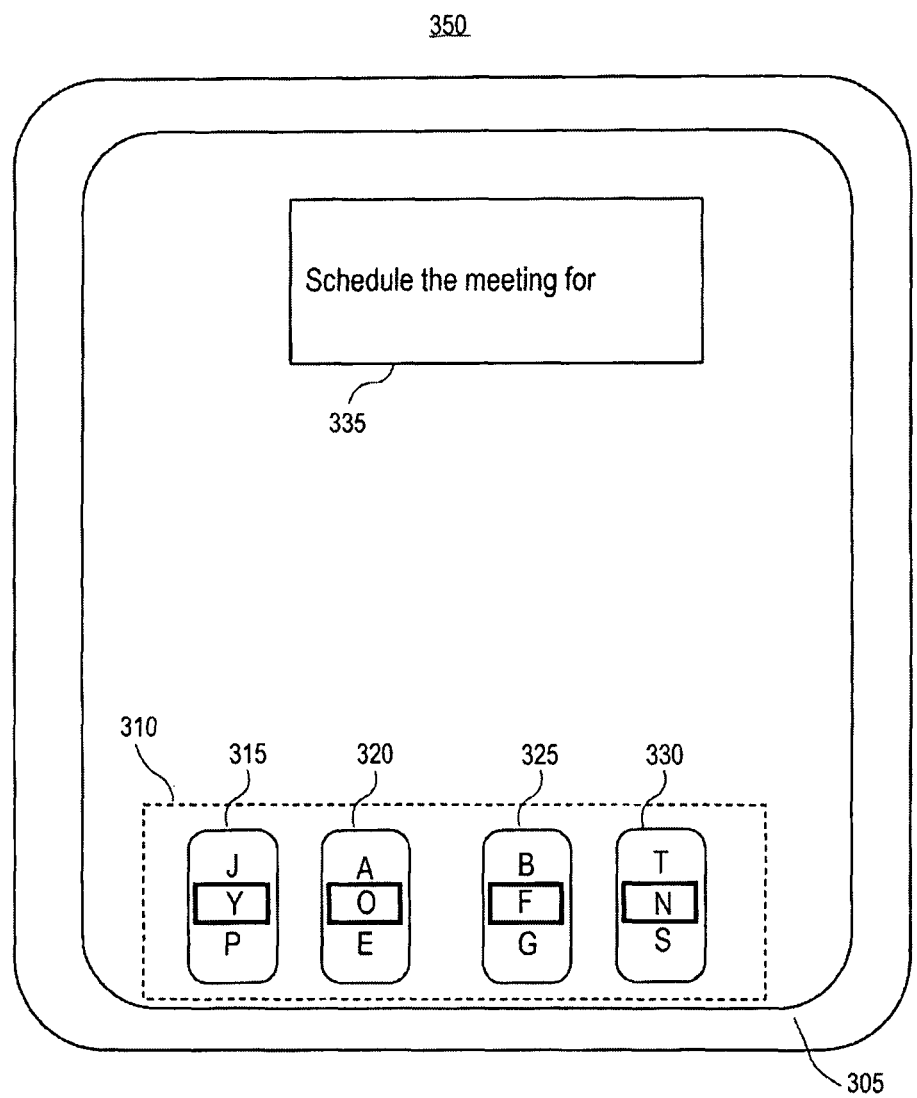

Character sections 315, 320, 325, and 330 can be placed at any location on display 305. FIG. 3B illustrates another exemplary placement of user interface 310. As illustrated, character sections 315, 320, 325, and 330 of user interface 310 can be displayed at a lower areas of display 305 near the bottom of electronic device 300. As such, a user can easily interact with character sections 315, 320, 325, and 330 while holding electronic device 300 at the bottom.

In addition to the examples described above, one skilled in the are will realize that character sections 315, 320, 325, and 330 of user interface 310 can be positioned at any location on display 305. Further, interface engine 115 can be configured to allow a user to define the location character sections 315, 320, 325, and 330 of user interface 310. As such, application interface 210 can be configured to generate a user interface to allow the user to define the location of character sections 315, 320, 325, and 330. After selection, control module 205 can store the defined locations in repository 215.

Figure 3C:
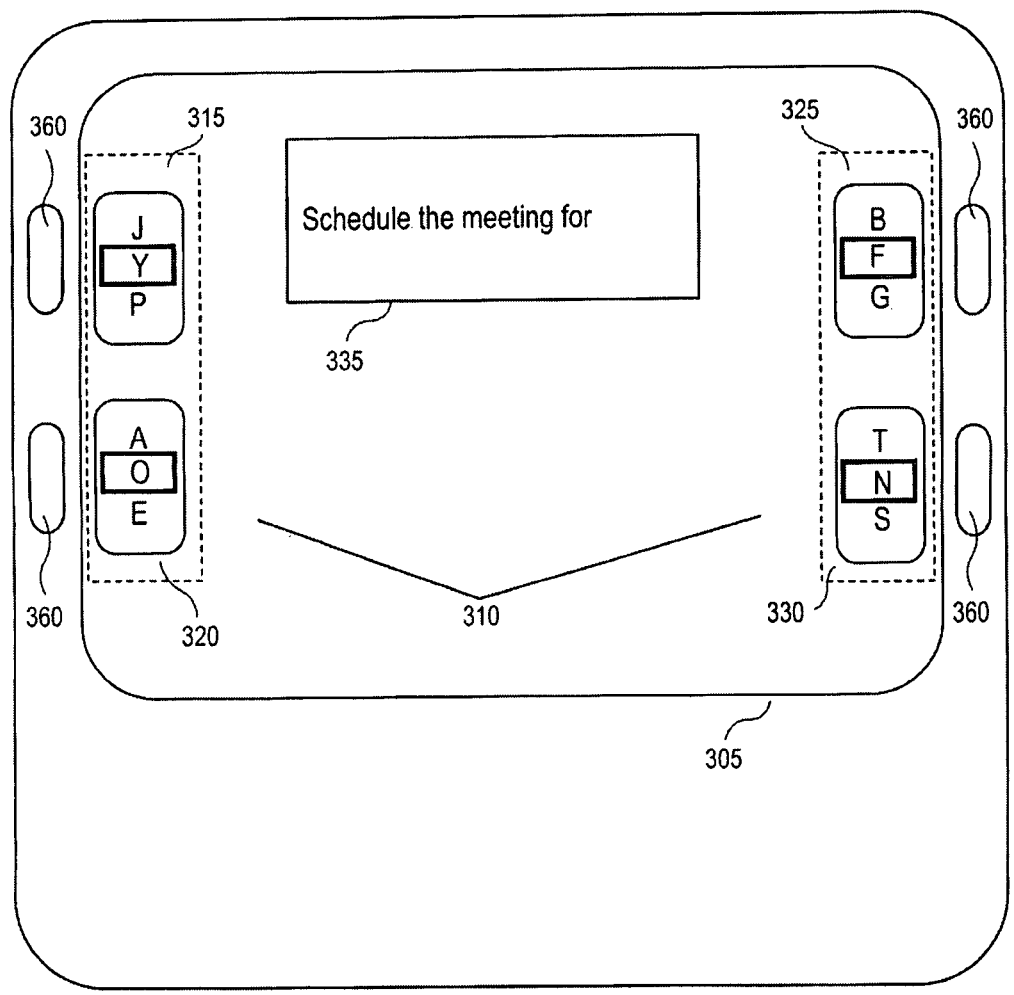

In addition to receiving input from display 305, interface engine can be configured to receive signal from additional input devices. FIG. 3C shows an example of an electronic device 355 according to embodiments.

As illustrate in FIG. 3C, device 355 can include a display 305 with user interface 310 as described above in FIG. 3A. Device 355 can also include input devices 360. Input devices 355 can be utilized by a user to initiate operations associated with interface 310. As such, interface engine 115 can be configured to associate the operations with the actions of input devices 360.

For example, input devices 360 can be scroll wheels that can rotate circularly and can be depressed. As such, interface engine 115 can associate the circular scrolling with the character section operations of displaying different characters in character sections 315, 320, 325, and 330. Additionally, interface engine 115 can associate the depression of devices 360 as a selection of characters displayed in the highlighting elements of character sections 315, 320, 325, and 330.

Figure 3D:
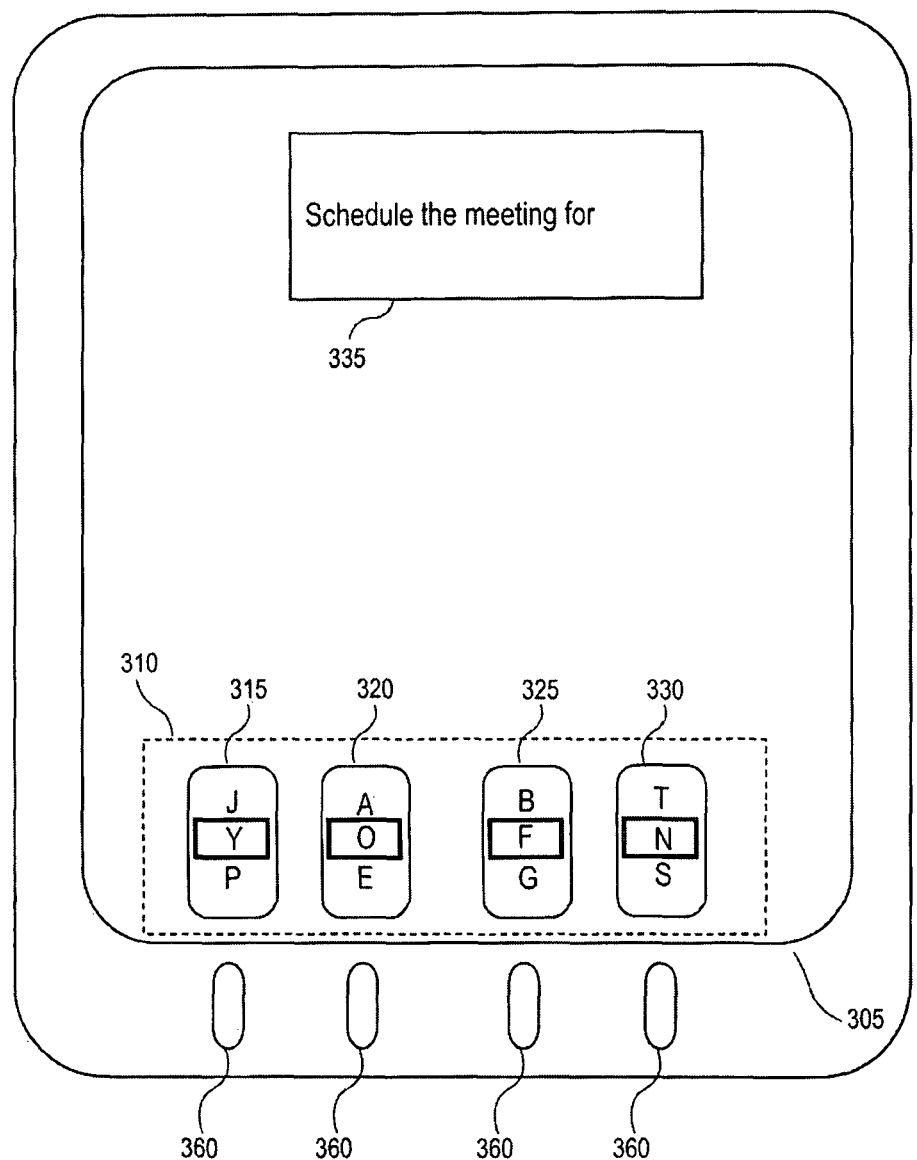

FIG. 3D shows another example of an electronic device 365 according to embodiments. As illustrated in FIG. 3D, device 365 can include a display 305 with user interface 310 as described above in FIG. 3B. Device 355 can also include input devices 360. Input devices 355 can be utilized by a user to initiate operations associated with interface 310. As such, interface engine 115 can be configured to associate the operations with the actions of input devices 360.

For example, input devices 360 can be scroll wheels that can rotate circularly and can be depressed. As such, interface engine 115 can associate the circular scrolling with the character section operations of displaying different characters in character sections 315, 320, 325, and 330. Additionally, interface engine 115 can associate the depression of devices 360 as a selection of characters displayed in the highlighting sections of character sections 315, 320, 325, and 330.

For the examples described above in FIGS. 3C and 3D, one skilled in the art will realize that input devices can be any type of input device and that any operation can be associated with input devices 360.

In the examples described above in FIGS. 3A-3D, character sections 315, 320, 325, and 330 can be displayed on display 305 as a visual "wheel." One skilled in the art will realize that the character sections can be visually displayed as any structure in order to display the characters circularly associated with the character sections. For example, the character sections can be visually displayed as a dial, rotary selector, digital number "flip," plus or minus indicators, and the like, or combinations thereof.

In the examples described above in FIGS. 3A-3D, the characters included in each subset of characters are individual characters. Additionally, partially-completed word, complete words, phrases, and the like can be included in the subsets. For example, a subset of characters associated with a character section can include commonly used words and phrases such as "the", "that", "there", ".com" and the like.

Returning to FIG. 2, as mentioned above, interface engine 115 can be configured to allow a user to define the characters displayed in the character sections, the operations associated with user actions, and the position of the character sections. As such, application interface 210 can be configured to generate a user interface to allow a user to define the characters displayed in the character sections, the operations associated with user actions, and the position of the character sections. After selection, control module 205 can store the selected characteristics in repository 215.

Figure 5:
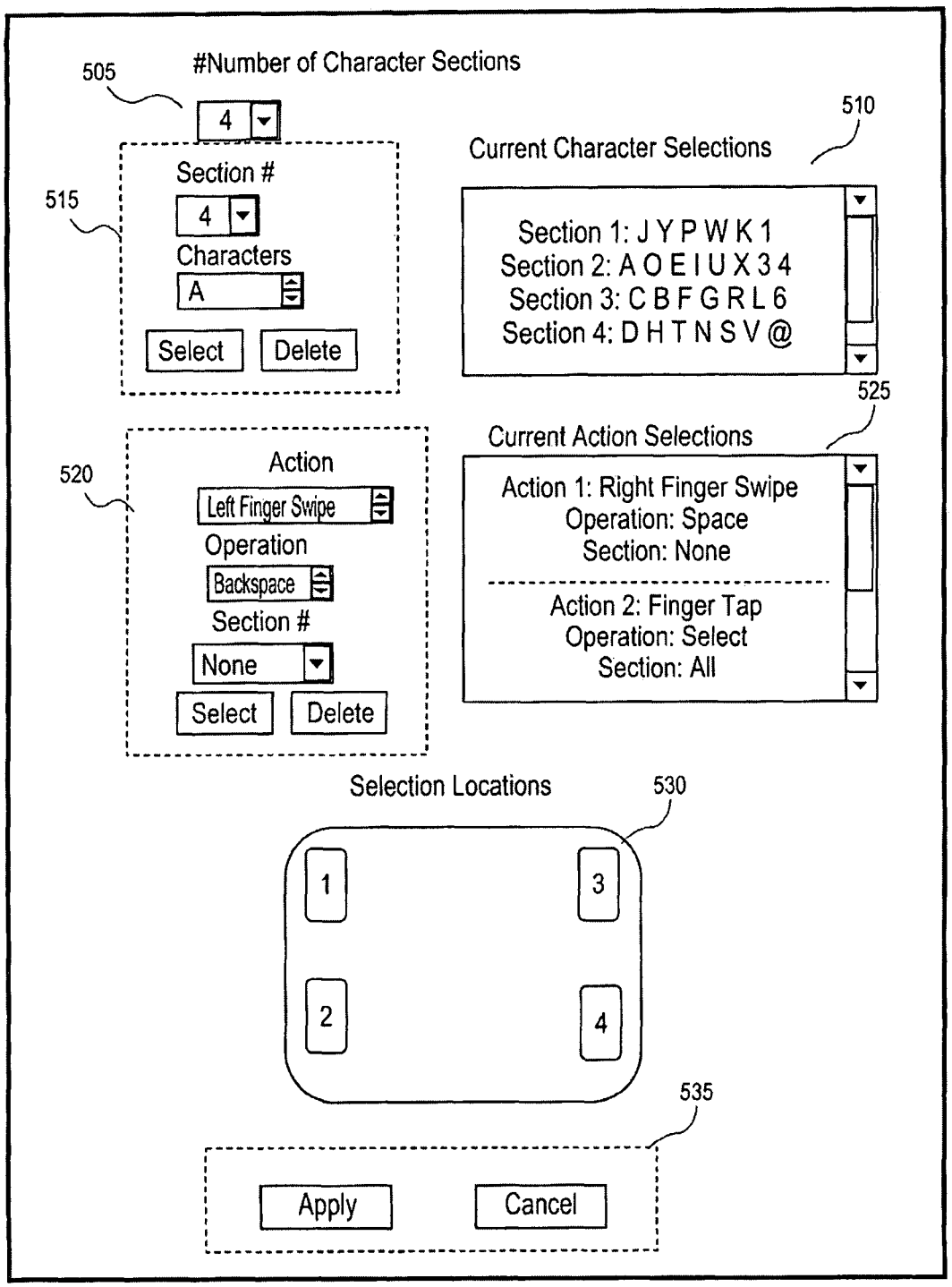
FIG. 5 illustrates an exemplary interface consistent with embodiments.

FIG. 5 illustrates an exemplary interface 500 for defining the characteristics of the user interface. It should be readily apparent to those of ordinary skill in the art that the diagram depicted in FIG. 5 represents a generalized schematic illustration and that other components may be added or existing components may be removed or modified.

As illustrated, interface 500 includes a variety of menus and text boxes to allow a user to define the characteristics of a user interface. Interface 500 can include a menu 505 to allow a user to select the number of character sections to include in the user interface.

Interface 500 can include one or more menus and buttons 515 to allow the user to associate characters with the character sections. For example, menus and buttons 515 can include a menu to select a character section and a menu to select characters to associate with the character sections. Menus and buttons 515 can include select and delete buttons to allow the user to add or delete the characters selected in the menus. Interface 500 can include a text window 510 to show the characters associated with the sections.

Interface 500 can also include one or more menus and buttons 520 to allow the user to associate operations with actions. For example, menus and buttons 520: can include a menus to select an action, a menu to select an operation, and a menu to select a character section with which to associate the action. Menus and buttons 520 can include select and delete buttons to allow the user to add or delete the action and operation selected. Interface 500 can include a text window 525 to show the associated actions and operations.

Interface 500 can include a section location window 530. Section location window 530 can allow the user to select the location on display 120 to display the character sections. Section location window 530 can represent the layout of display 120. For example, interface engine 115 can generate interface 500 to allow the user to "drag" the character sections to different locations in section location window 520 which represents the layout of display 120.

Interface 500 can also include confirmation buttons 535. Confirmation buttons 535 can include an apply button and a cancel button. A user can apply or cancel the characteristics selected in interface 500 utilizing confirmation buttons 535.

Interface engine 115 can generate interface 500 in response to a command from display 120, operating system 105, applications 110, secondary inputs 125, or combinations thereof. In response to the command, interface engine 115 can retrieve the current characteristics from repository 215 and generate interface 500. Interface engine 115 can then update the characteristics of the user interface in repository 215 based on the user selections of interface 500.

In addition to selecting each individual characteristic, interface engine 115 can store one or more predetermined characteristic settings for the interface. As such, interface engine 115 can generate interface 500 to allow the user to select one of the predetermined characteristic settings.

Figure 6:
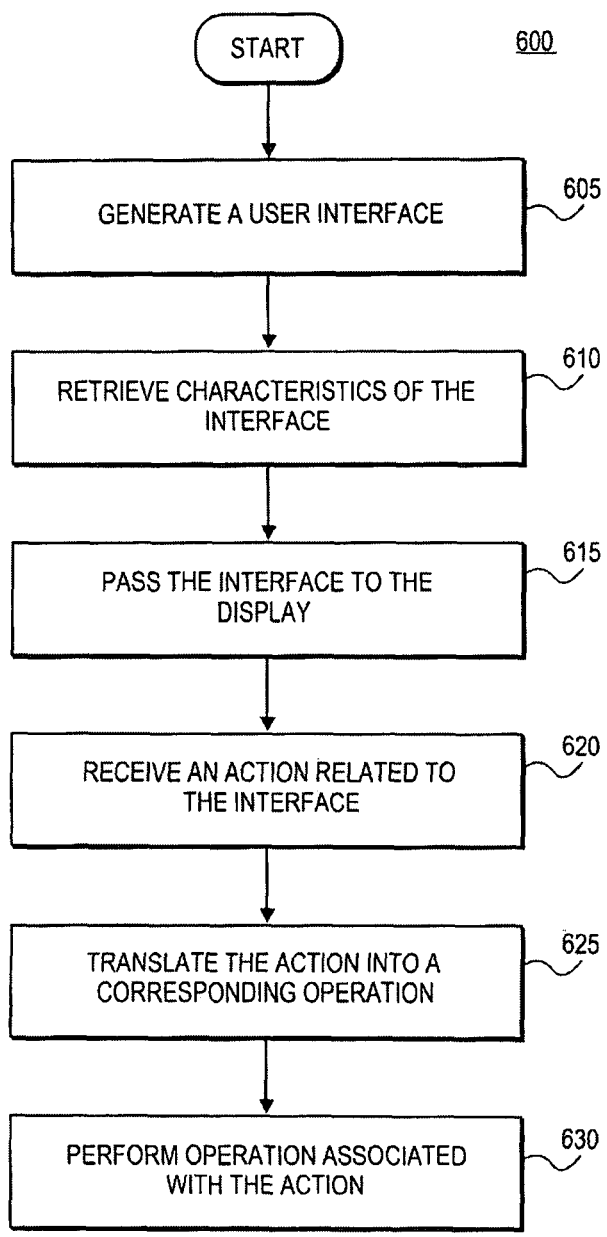
FIG. 6 illustrates an exemplary process consistent with embodiments.

Interface engine 115 generates and functions of a user interface, for example interface 310, upon the initiation of software environment 100. For example, in an electronic device, such as device 300, once the device is powered up, software environment 100 initiates and operating system 105 begins booting loading commands and application to operate the device. During the loading sequence or afterwards, interface engine 115 can receive a command to generate and operate a user interface. This command can be sent by operating system 105 or applications 110. FIG. 6 is a flow diagram of an example process flow 600 of the generation and operation of a user interface.

As illustrated, in step 605, interface engine 115 generates a user interface in response to a command to generate the interface. The command can be received from operating system 105, application, display 120, secondary input 125, or combination thereof.

In step 610, interface engine 115 retrieves the characteristics of the interface from repository 215. The characteristics can be the characters associated with the interface, the characters to be displayed in the interface, the design of the interface, the location to display the interface on display 120, and the like. Interface engine 115 can use the characteristics to generate the interface.

Then, in step 615, interface engine 115 passes the interface to display 120. Interface engine 115 can pass the interface directly to display 120 or via other components of software environment 100 such as operating system 105.

Next, in step 620, interface engine 115 can receive action related to the operations of the user interface. The actions can be received from display 120, secondary input 125, and combinations thereof.

In response to the actions, in step 625, interface engine 115 can translate the actions into the corresponding operations. Interface engine 115 can translate the action by searching repository 215 for the action and retrieving the associated operation. For example, interface engine 115 can receive an action such as a physical contact with the display as illustrated in FIGS. 4A and 4B.

Then, in step 630, interface engine 115 can perform the operation associated with the action. For example, interface engine 115 can update characters displayed in the interface or pass a character to an application as illustrated in FIGS. 4A and 4B.

Interface engine 115 can continue to receive and translate actions associated with the interface until interface engine receives a command to discontinue the interface. The command can be received from operating system 105, application, display 120, secondary input 125, or combination thereof.

Figure 7:
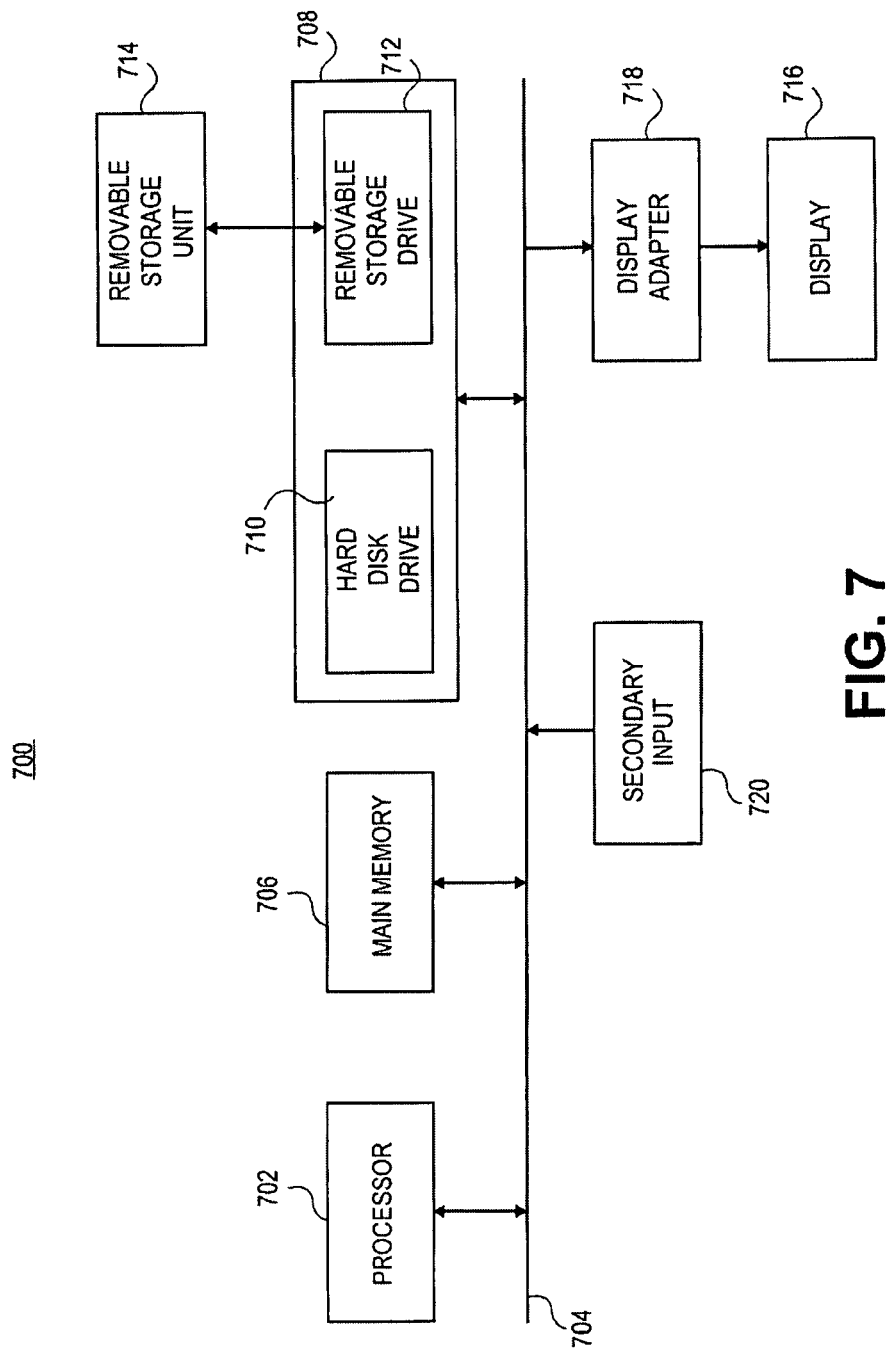
FIG. 7 illustrates an exemplary computing platform consistent with embodiments.

FIG. 7 illustrates an exemplary block diagram of a computing platform 700 where an embodiment may be practiced. For example, computing platform can represent exemplary components of computing device 300. The functions of the interface engine 115 can be implemented in program code and executed by computing platform 700. Interface engine 115 can be implemented in computer languages such as PASCAL, C, C++, JAVA, etc.

As shown in FIG. 7, computing platform 700 includes one or more processors, such as processor 702 that provide an execution platform for embodiments of interface engine 115. Commands and data from processor 702 are communicated over a communication bus 704. Computing platform 700 also includes a main memory 706, such as a Random Access Memory (RAM), where interface engine 115 can be executed during runtime, and a secondary memory 708. Secondary memory 708 includes, for example, a hard disk drive 710 and/or a removable storage drive 712, representing a floppy diskette drive, a magnetic tape drive, a compact disk drive, etc., where a copy of a computer program embodiment for interface engine 115 can be stored. Removable storage drive 712 reads from and/or writes to a removable storage unit 714 in a well-known manner. A user can communicate with interface engine 115 with a display 716 and secondary input 720. Display adapter 718 interfaces with the communication bus 704 and display 716. Display adapter 718 also receives display data from processor 702 and converts the display data into display commands for display 716.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method comprising:
providing, by a computing device with a display, a configuration interface comprising a character section selection menu, a current character selections window displaying selections from the character section selection menu, an operation selection menu, and a current action selections window displaying selections from the operation selection menu;
receiving a user selection of characters to associate with a plurality of scrollable subsets of characters via the character section selection menu;
displaying the user selection of characters to associate with the plurality of scrollable subsets of characters in the current character selections window;
receiving user input associating a swiping action with a spacing operation via the operation selection menu;
displaying the user input associating the swiping action with the spacing operation in the current action selections window;
storing the association of the swiping action with the spacing operation and the association of the user selected characters with the plurality of scrollable subsets of characters in a repository of the computing device;
receiving user input defining a user-defined location on the display for the plurality of scrollable subsets of characters;
storing the user-defined location for the plurality of scrollable subsets of characters in the repository of the computing device;
providing a visual interface to receive a user input of the swiping action, the visual interface comprising the plurality of scrollable subsets of characters on the display, wherein the plurality of scrollable subsets of characters are configured to adjust independently of each other in response to signals received from the display; and
performing the spacing operation in response to receiving the user input of the swiping action via the visual interface in the display of the computing device.

2. The method of claim 1, further comprising:
receiving signals from the display related to the visual interface, wherein the received signals represent physical actions performed on the display; and
translating the received signals into operations related to the plurality of scrollable subsets of characters.

3. The method of claim 2, further comprising changing at least one character to be displayed in a corresponding scrollable subset of characters of the plurality of scrollable subsets of characters.

4. The method of claim 2, further comprising transferring a selected character associated with one of the plurality of scrollable subsets of characters to an application hosted by the computing device.

5. The method of claim 2, further comprising:
comparing selected characters from the visual interface to frequently used words; and
providing a completed word when the selected characters match a portion of the completed word.

6. The method of claim 2, further comprising:
receiving additional signals from an input device; and
translating the additional signals into the operations associated with the visual interface.

7. The method of claim 1, wherein the configuration interface further comprises a location selection menu for selecting a location on the display to display the plurality of scrollable subsets of characters.

8. The method of claim 1, wherein the plurality of scrollable subsets of characters are associated with characters based on a frequency of use of the characters.

9. A system comprising:
a repository to store an association of a swiping action with a spacing operation and an association of user selected characters with a plurality of scrollable subsets of characters; and
a processor coupled to the repository, wherein the processor is to:
provide a configuration interface comprising a character section selection menu, a current character selections window displaying selections from the character section selection menu, an operation selection menu, and a current action selections window displaying selections from the operation selection menu,
receive a user selection of characters to associate with the plurality of scrollable subsets of characters via the character section selection menu,
display the user selection of characters to associate with the plurality of scrollable subsets of characters in the current character selections window,
receive user input associating the swiping action with the spacing operation via the operation selection menu,
display the user input associating the swiping action with the spacing operation in the current action selections window,
receive user input defining a user-defined location on a display for the plurality of scrollable subsets of characters,
store the user-defined location for the plurality of scrollable subsets of characters in the repository,
provide a visual interface to receive a user input of the swiping action, the visual interface comprising the plurality of scrollable subsets of characters on the display, wherein the plurality of scrollable subsets of characters are configured to adjust independently of each other in response to signals received from the display, and
perform the spacing operation in response to receiving the user input of the swiping action via the visual interface in the display.

10. The system of claim 9, wherein the processor is further to:
receive signals from the display related to the visual interface, wherein the received signals represent physical actions performed on the display; and
translate the received signals into operations related to the plurality of scrollable subsets of characters.

11. The system of claim 10, wherein the processor is further to:
change at least one character to be displayed in a corresponding scrollable subset of characters of the plurality of scrollable subsets of characters.

12. The system of claim 10, wherein the processor is further to:
receive additional signals from an input device; and
translate the additional signals into operations associated with the visual interface.

13. The system of claim 9, wherein
the configuration interface further comprises a location selection menu for selecting a location on the display to display the plurality of scrollable subsets of characters.

14. A device, comprising:
a repository to store an association of a swiping action with a spacing operation and an association of user selected characters with a plurality of scrollable subsets of characters;
a processor coupled to the repository; and
an interface engine executed by the processor that:
provides a configuration interface comprising a character section selection menu, a current character selections window displaying selections from the character section selection menu, an operation selection menu, and a current action selections window displaying selections from the operation selection menu,
receives a user selection of characters to associate with the plurality of scrollable subsets of characters via the character section selection menu,
displays the user selection of characters to associate with the plurality of scrollable subsets of characters in the current character selections window;
receives user input associating a swiping action with a spacing operation via the operation selection menu,
displays the user input associating the swiping action with the spacing operation in the current action selections window,
receives user input defining a user-defined location on a display for the plurality of scrollable subsets of characters,
stores the user-defined location for the plurality of scrollable subsets of characters in the repository,
provides a visual interface to receive a user input of the swiping action, the visual interface comprising the plurality of scrollable subsets of characters on the display, the selection of characters for a corresponding scrollable subset of characters arranged to be rotably displayed on the display, wherein the plurality of scrollable subsets of characters are configured to adjust independently of each other in response to signals received from the display, and
performs the spacing operation in response to receiving the user input of the swiping action via the visual interface in the display.

15. The device of claim 14, wherein the interface engine further: receives signals from the display related to the visual interface; and translates received signals into a first operation to rotate one of the plurality of scrollable subsets of characters to display new characters from the scrollable subset of characters on the display.

16. The device of claim 15, wherein the interface engine further: translates the received signals into a second operation to transfer a selected character from the scrollable subsets of characters to an application hosted by the device.

17. The device of claim 14, further comprising: an input device coupled to the interface engine, wherein the interface engine further: receives additional signals from the input device; and translates the additional signals into operations associated with the visual interface.

18. The device of claim 14, wherein the configuration interface further comprises a location selection menu for selecting a location on the display to display the plurality of scrollable subsets of characters.

19. A non-transitory computer readable storage medium including instructions that, when executed by a processor, cause the processor to perform operations comprising:
   providing a configuration interface comprising a character section selection menu, a current character selections window displaying selections from the character section selection menu, an operation selection menu, and a current action selections window displaying selections from the operation selection menu;
   receiving a user selection of characters to associate with a plurality of scrollable subsets of characters via the character section selection menu;
   displaying the user selection of characters to associate with the plurality of scrollable subsets of characters in the current character selections window;
   receiving, by the processor, user input associating a swiping action with a spacing operation via the operation selection menu;
   displaying the user input associating the swiping action with the spacing operation in the current action selections window;
   storing the association of the swiping action with the spacing operation and the association of the user selected characters with the plurality of scrollable subsets of characters in a repository coupled to the processor;
   receiving user input defining a user-defined location on a display for the plurality of scrollable subsets of characters;
   storing the user-defined location for the plurality of scrollable subsets of characters in the repository;
   providing a visual interface to receive a user input of the swiping action, the visual interface comprising the plurality of scrollable subsets of characters on the display, wherein the plurality of scrollable subsets of characters are configured to adjust independently of each other in response to signals received from the display; and
   performing the spacing operation in response to receiving the user input of the swiping action via the visual interface in the display.

20. The non-transitory computer readable storage medium of claim 19, the operations further comprising: receiving signals from the display related to the visual interface, wherein the received signals represent physical actions performed on the display; and translating the received signals into operations related to the plurality of scrollable subsets of characters, wherein the operations comprise comparing selected characters from the visual interface to frequently used words and providing a completed word when the selected characters match a portion of the completed word.

* * * * *